United States Patent [19]

Williams

[11] Patent Number: 5,120,437
[45] Date of Patent: Jun. 9, 1992

[54] PORTABLE WATER FILTRATION APPARATUS

[76] Inventor: Richard T. Williams, P.O. Box 39, Uwchland, Chester County, Pa. 19480

[21] Appl. No.: 745,487

[22] Filed: Aug. 15, 1991

[51] Int. Cl.⁵ ............................................. B01D 61/18
[52] U.S. Cl. ................................. 210/244; 210/282; 210/321.78; 210/321.87
[58] Field of Search .................... 210/642, 25.1, 244, 210/245, 246, 263, 264, 282, 283, 291, 287, 321.78, 321.72, 321.87

[56] References Cited

U.S. PATENT DOCUMENTS

3,744,639  7/1973  Teeple et al. .................... 210/265

*Primary Examiner*—Frank Sever
*Attorney, Agent, or Firm*—John F. A. Earley; John F. A. Earley, III

[57] ABSTRACT

A portable water filtration apparatus for filtering and purifying water comprises a container for holding water, a pump block mounted inside the container, the pump block having a water inlet port, a water outlet port; and a passageway extending through the pump block between the inlet port and the outlet port, a water filter unit mounted on the water inlet port, a pump mounted in an opening in the pump block accessing the pump to the passageway in the pump block, first valve means positioned in the passageway of the pump block for blocking flow of water in the passageway from the pump to the inlet port of the pump block, a microfiltration canister mounted in the water outlet port of the pump block, the canister having a spout through which purified water is pumped, and second valve means positioned at the outlet port of the pump block for blocking flow of water from the microfiltration canister back into the pump block.

19 Claims, 9 Drawing Sheets

PORTABLE WATER FILTRATION APPARATUS

BACKGROUND OF THE INVENTION

Field of the Invention

This invention relates to filtration and purification of water, and more particularly concerns a portable water filtration apparatus for filtering and purifying water obtained, for example, from a stream by a camper on a camping trip, or, for example, from a water faucet connected to an unpurified water source in an undeveloped area.

SUMMARY OF THE INVENTION

It is an object of the invention to provide a portable water filtration apparatus that is small enough to be carried in a backpack, a suitcase, a briefcase, and the like.

Another object of the invention is to provide such a water filtration apparatus that removes giardia, amoebae, and larger pathogens, waterborne disease-causing bacteria, toxic chemicals, foul tastes and odors, dirt and sediment, and radioactive particles.

Another object of the invention is to provide such a water filtration apparatus that includes a self-contained pump and three levels of filtration.

Another object of the invention is to provide a portable water filtration apparatus that is easy to use and is light-weight.

Still another object of the invention is to provide a portable water filtration apparatus that remains steady even when placed on uneven surfaces and that is capable of providing a substantial amount of purified water, for example, about one pint of microfiltered water per minute.

These and other objects are accomplished by providing a portable water filtration apparatus filtering and purifying water which comprises a container, a pump block mounted in the container, a water filter unit mounted on the pump block, a pump mounted on the pump block, and a microfiltration canister mounted on the pump block.

A beauty plate having a screen in it is mounted across the opening of the container, and the handle of the pump and a spout extending from the microfiltration canister extend through the beauty plate.

Water that is to be purified may be poured through the screen in the beauty plate into the container. There, it may be pumped through the water filter unit and through the microfiltration canister, and out the spout into a clean receptacle for holding the purified water.

Three check valves are provided to control the flow of water into and through the pump block. The first check valve is located in the water filter unit and closes when the water level in the container drops below the outlet port of the water filter unit to block air from being sucked into the pump block from the water filter unit. The second check valve is located in the pump block and blocks the flow of water from the pump to the water inlet ports of the pump block. The third check valve also is located in the pump block and blocks the flow of water from the canister back to the pump.

A lid is provided for covering the spout, the handle, and the beauty plate when the portable water filtration apparatus is not in use.

Since the water filtration apparatus is small and portable, it may be used by campers to purify water obtained from streams and rivers, and it may be stored in the camper's backpack when not in use. Further, a traveler may carry the portable water filtration apparatus in a suitcase, a briefcase, and the like when traveling to places where local tap water is not purified. The local unpurified water may be purified quickly in the water filtration apparatus of the invention.

DETAILED DESCRIPTION OF THE DRAWINGS

Figure 1:
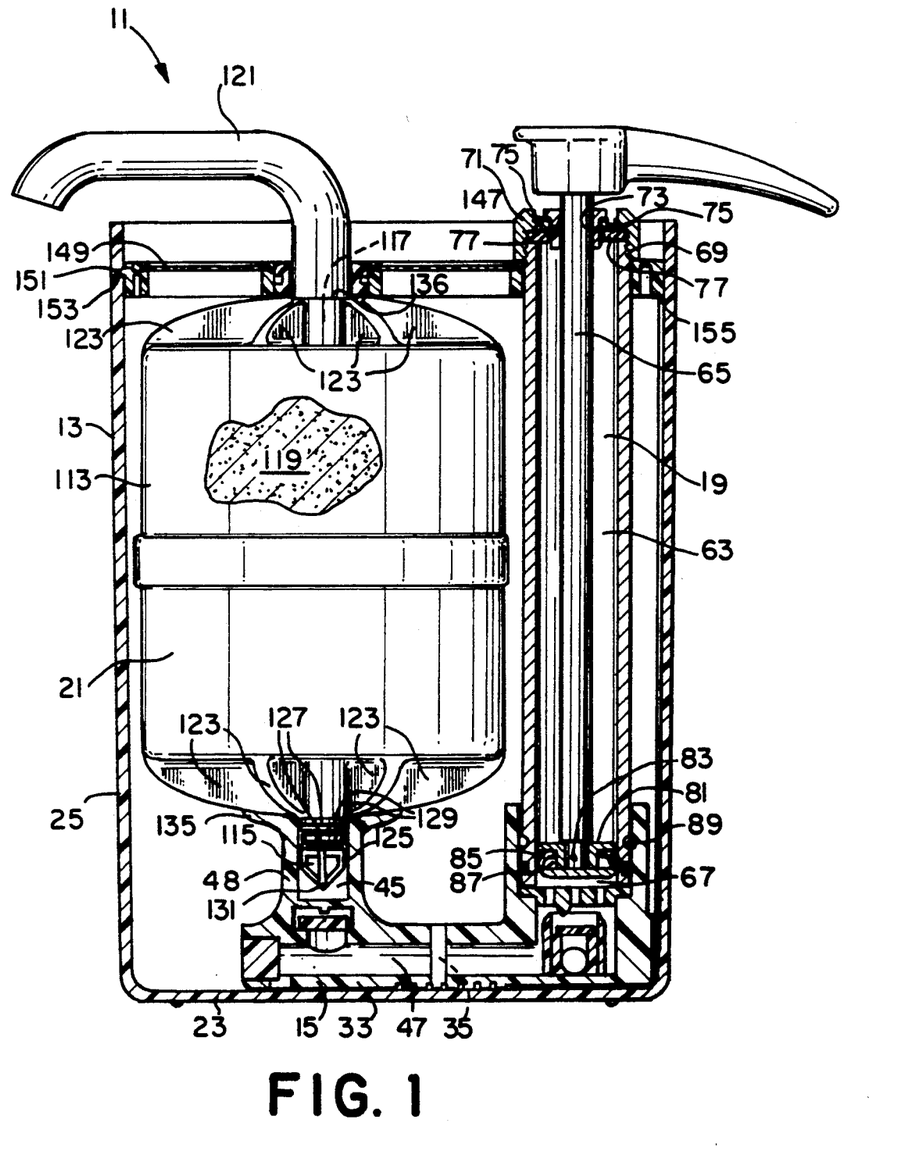
FIG. 1 is a view in cross section of the portable water filtration apparatus constructed in accordance with the invention.
Figure 5:
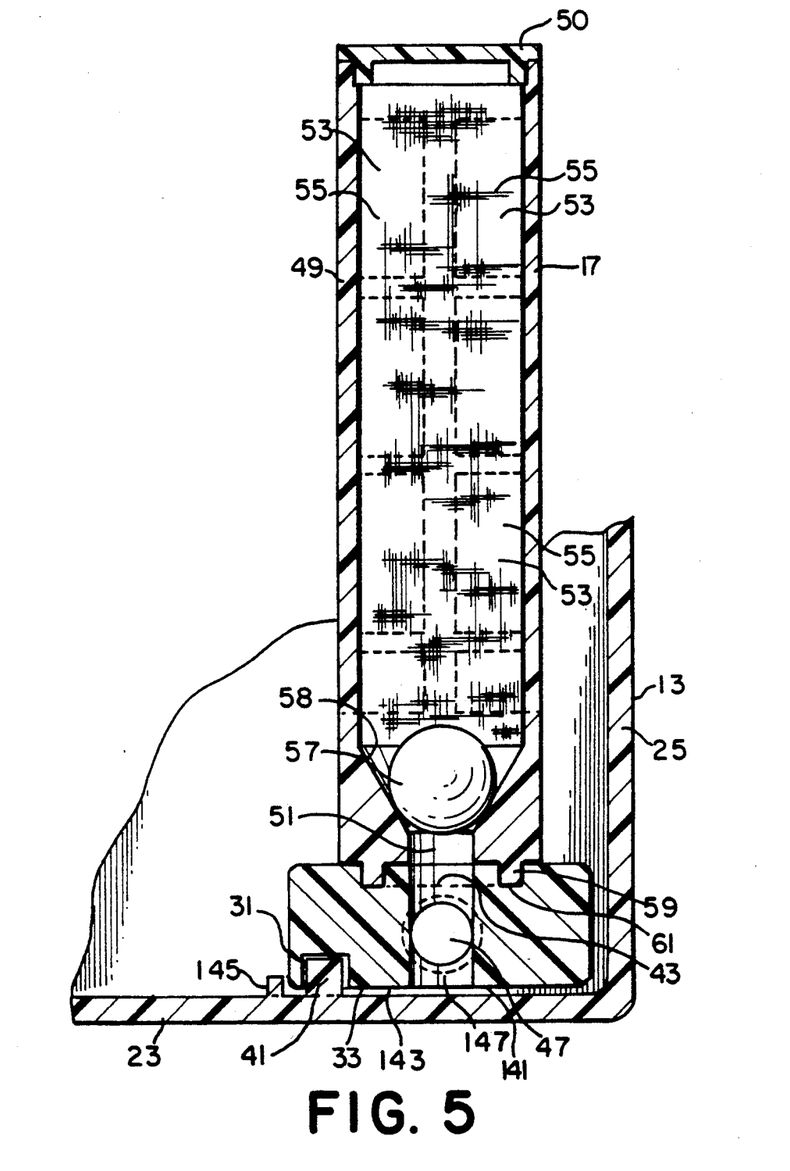
FIG. 5 is a view in cross section of the inlet ports of the pump block shown in FIG. 4 with a water filter unit mounted over the upper water inlet port of the pump block.

Turning to the drawings, there is shown in FIGS. 1 and 5 a portable water filtration apparatus 11 for filtering and purifying water which comprises a container 13, a pump block 15 mounted in the container 13, a water filter unit 17 (FIG. 5) mounted on the pump block 15, a pump 19 mounted on the pump block 15, and a microfiltration canister 21 mounted on the pump block 15.

Figure 11:
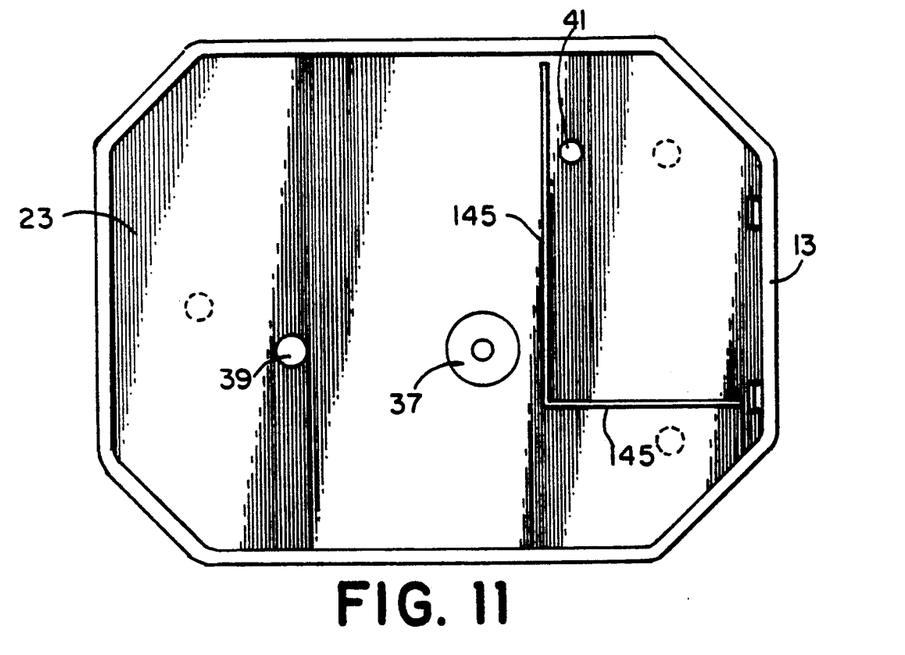
FIG. 11 is a view in top plan of the container of the invention.

Referring to FIGS. 1 and 11, container 13 has a bottom wall 23 and a substantially octagonally-shaped side wall 25 extending upwardly from bottom wall 23.

Figure 2:
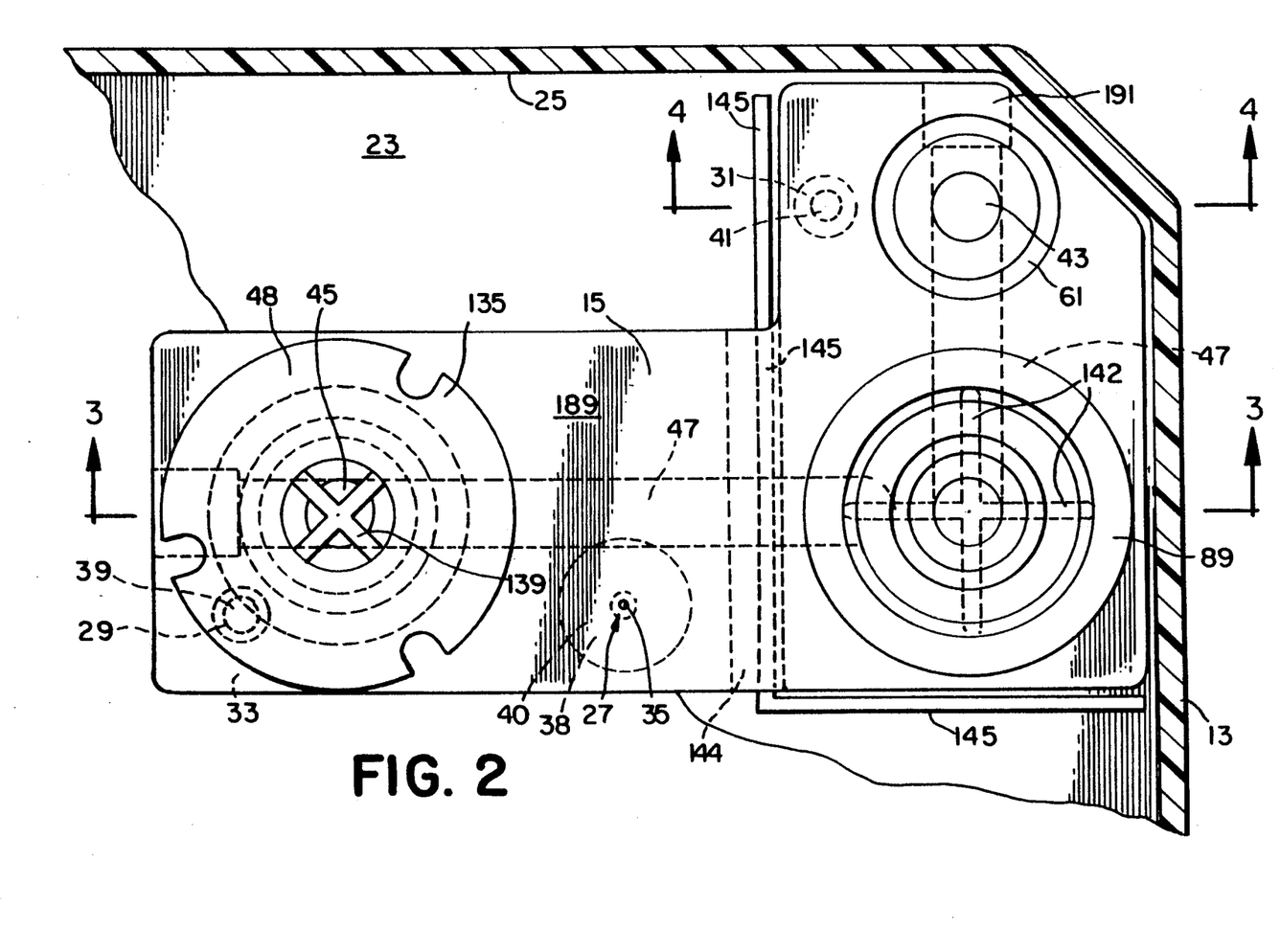
FIG. 2 is a view in top plan of a pump block mounted on the bottom wall of the container.

As shown in FIGS. 2 and 11, pump block 15 has three upwardly extending bores 27, 29, and 31 formed in its bottom wall 33, and pump block 15 is mounted on the bottom wall 23 of container 13 with a screw 35 (FIGS. 1, 2 and 17) that extends from outside the container 13 through the bottom wall 23 of container 13 and a stud 37 formed on the bottom wall 23 inside container 13 into bore 27 of pump block 15, where the threads of screw 35 engage the wall of bore 27. The head of the screw 35 is countersunk in the outside bottom wall 23 of container 13. Referring to FIGS. 1, 2, 11 and 17, an annular recess 38 is formed in the bottom wall 33 of pump block 15 around the entrance to bore 27 to receive stud 37 and an annular elastomeric seal 40. Studs 39 and 41 are also formed in the bottom wall 23 of container 13 and are received by bores 29 and 31 to prevent rotation of pump block 15 around screw 35.

As shown in FIG. 2, pump block 15 has a water inlet port 43, a water outlet port 45, and a passageway 47 extending through pump block 15 between the inlet port 43 and the outlet port 45. Outlet port 45 is formed by a hollow pedestal 48, which is better shown in FIG. 3, that is bonded to the top wall of pump block 15 at the end of passageway 47.

Turning to FIG. 5, water filter unit 17 has a cylindrical tube 49 that is closed at its top end portion by a cap 50 and that has an outlet port 51 at its bottom end. Tube 49 has openings 53, and a screen 55, preferably made of nylon, is mounted on the tube 49 to cover the openings 53. Screen 55 has a mesh in a range of 1 to 50 microns to remove any particulate larger than this mesh from the unfiltered water passing through it. Preferably, screen 55 has a mesh in a range of 10 to 20 microns.

A ball-shaped float 57 is positioned inside tube 49 and has a specific gravity that is less than the specific gravity of water. Preferably, float 57 is made of low density polyethylene. Float 57 rests on top of the water in container 13 so long as the level of the water is above outlet port 51 of tube 49. When the water level is lower than outlet port 51 of tube 49, float 57 sits on the chamfered edge of the annular-shaped bottom wall 58 of tube 49, closing the outlet port 51 and blocking air from being sucked into inlet port 43 of pump block 15.

Tube 49 has a downwardly extending annular ring 59 formed on its bottom wall 58, and ring 59 is press fit into a corresponding annular recess 61 formed in pump block 15 around water inlet port 43 of pump block 15.

Figure 6:
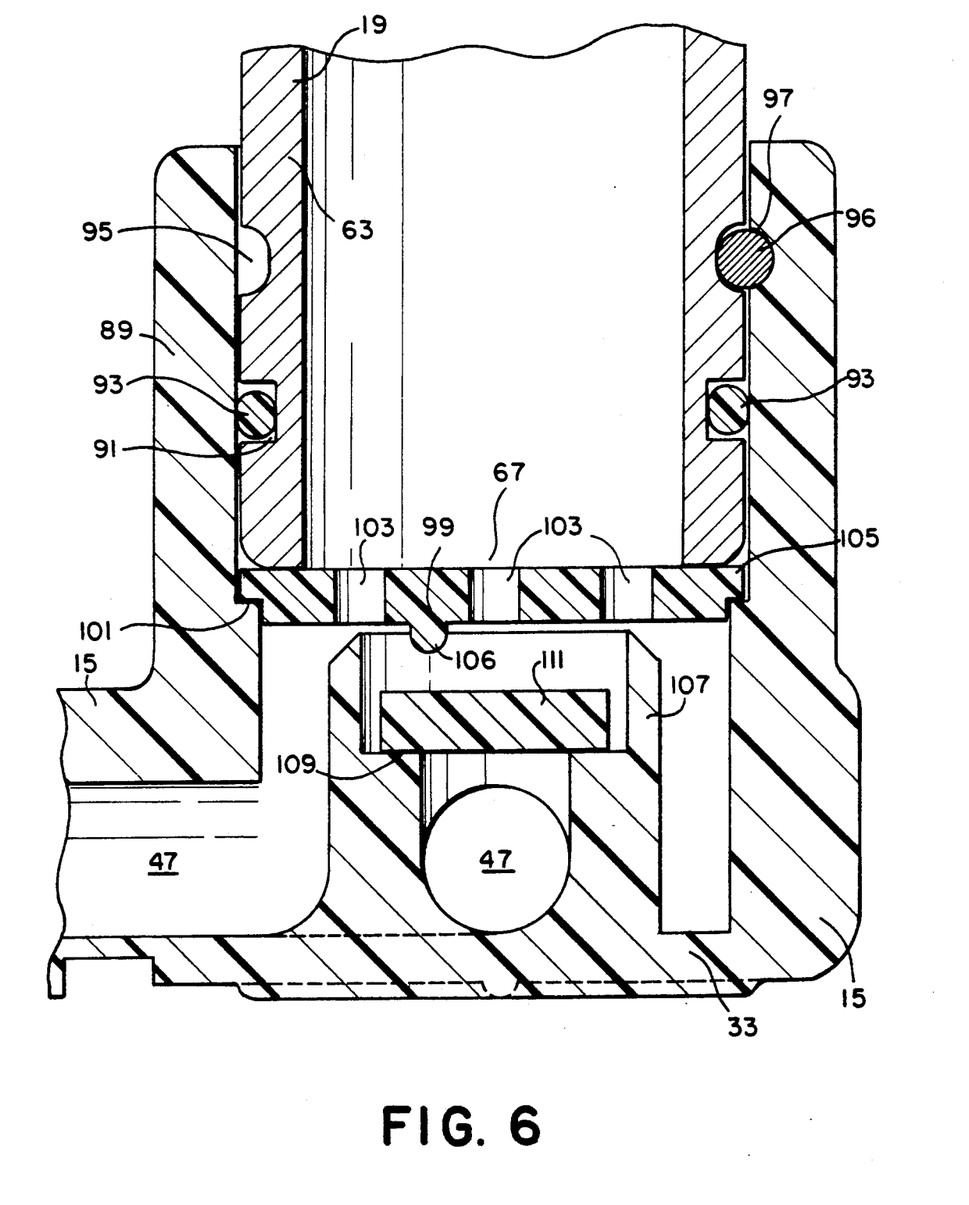
FIG. 6 is a partial view in cross section of the pump barrel mounted on the pump block and of a flapper valve located below the pump barrel.

Referring to FIGS. 1 and 6, pump 19 includes a pump barrel 63, and a pump rod 65 adapted to move back and forth inside pump barrel 63. Pump barrel 63 has a port 67 at its water receiving/discharging end portion from which to receive and to discharge water.

A threaded upper end portion 69 of pump barrel 63 receives a retaining nut 71. Retaining nut 71 has an opening 73 for receiving the pump rod 65 and air holes 75 for the passage of air into and from the pump barrel 63 as the pump rod 65 is moved up and down in the pump barrel 63. Optionally, an annular gasket 77 made of hydrophobic membrane material, such as Gortex material, may be positioned in the pump barrel 63 next to retaining nut 71 to block the passage of water but permit the passage of air.

A nylon bushing 77, which receives pump rod 65, is mounted in opening 73 of retaining nut 71 to provide a smooth pumping action.

A piston 81 is mounted on the end portion of pump rod 65 using a pin 83, and a piston seal 85 is mounted on piston 81 in an annular groove 87. Piston seal 85 is sized to slide tightly against the inside of pump barrel 63.

As shown in FIG. 6, a cylindrical socket 89, which is open to passageway 47, is formed in the upper end portion of pump block 15 and receives the water receiving/discharging end portion of pump barrel 63. The water receiving/discharging end portion of pump barrel 63 is provided with an annular groove 91 that receives an 0-ring 93. A second annular groove 95 is formed in the receiving/discharging end portion of pump barrel 63 that receives a pin 96 extending through a bore 97 extending through socket 89, thereby securing pump barrel 63 to socket 89.

Figure 7:
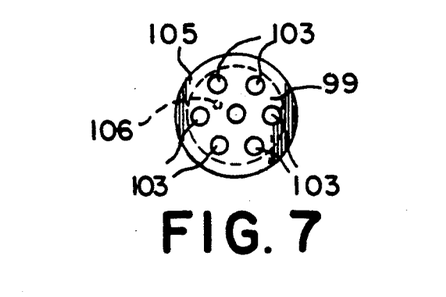
FIG. 7 is a view in top plan of a flapper valve retainer.

A flapper valve retainer 99 is secured in socket 89 between a ledge 101 and the bottom edge of pump barrel 63. Flapper valve retainer 99 (FIG. 7) has a coin-shaped body portion having openings 103 formed therein to permit the passage of water therethrough. An annular ring 105 extends from the body portion, and a downwardly extending protuberance 106 is mounted on the bottom of the flapper valve retainer 99.

A socket 107 extends upwardly from the bottom wall 33 of pump block 15 towards but just short of flapper valve retainer 99. An annular ledge 109 is formed inside socket 107, and a solid rubber cylindrical flapper member 111 is placed inside socket 107 for movement between ledge 109 and flapper valve retainer 99. When water is being pulled into pump 19 from pump block inlet port 43, it passes through the portion of passageway 47 between the inlet port 43 and the port 67 of pump barrel 63. Passageway 47 passes through the side of socket 107 and upwardly through socket 107. The water moving toward pump 19 pushes flapper member 111 upwardly against flapper retainer valve 99, but protuberance 106 prevents flapper member 111 from covering the openings 103 in flapper valve retainer 99. When water is expelled from pump 19, the expelled water pushes flapper member 111 against ledge 109, thereby closing the portion of passageway 47 leading back to inlet port 43 and preventing the expelled water from flowing back to water inlet port 43, and causing the expelled water to flow downwardly around the outside of socket 107 and then downwardly towards water outlet port 45.

Referring to FIG. 1, canister 21 is manufactured by General Ecology, Inc. of Exton, Pa. Canister 21 has a housing 113 having an inlet port 115, an outlet port 117, and a spout 121 is mounted over the canister outlet port 117 to convey the filtered and purified water from the canister 21.

Canister inlet port 115 is formed by a hollow cylindrical inlet stem 125 having annular grooves 127 formed in it which receive 0-rings 12 for sealing canister inlet port 115 when it is mounted in pump block outlet port 45. Inlet stem 125 has a perforated pointed tip portion 131 through which water may flow.

Six ribs 123, that are substantially equally spaced from one another, extend radially outwardly away from the central axis of canister inlet port 115. Each rib 123 is integral with the bottom wall of the canister housing 113, and each rib 123 curves upwardly as it extends outwardly away from the central axis of canister inlet port 115.

Pedestal 48 of pump block 15 has a lip 135 that is shaped to conform with and support the ribs 123 surrounding canister inlet port 115. When canister inlet stem 25 is mounted in pump block outlet port 45, canister 21 may rotate around the central axis of stem 125 to permit the spout 121 to be positioned as desired.

Canister outlet port 117 is formed by a hollow stem 134, which is integral with canister housing 113 and spout 121 to substantially eliminate the possibility of unfiltered water entering the canister 21 between a joint between the canister housing 113 and the spout 121 if canister housing 113 and spout 121 were not integral with each other.

Like the bottom wall of canister housing 113, the top wall of canister housing 113 is provided with six ribs 123 that are substantially equally spaced apart from one another and that extend radially outwardly away from the central axis of stem 134.

A microfiltration matrix 119 positioned inside housing 113 between inlet port 115 and outlet port 117. Microfiltration matrix 119 has a 0.1 micron (0.4 absolute) to a 10 micron retention for removing chemical, microbiological, and fine particulate contamination.

Figure 8:
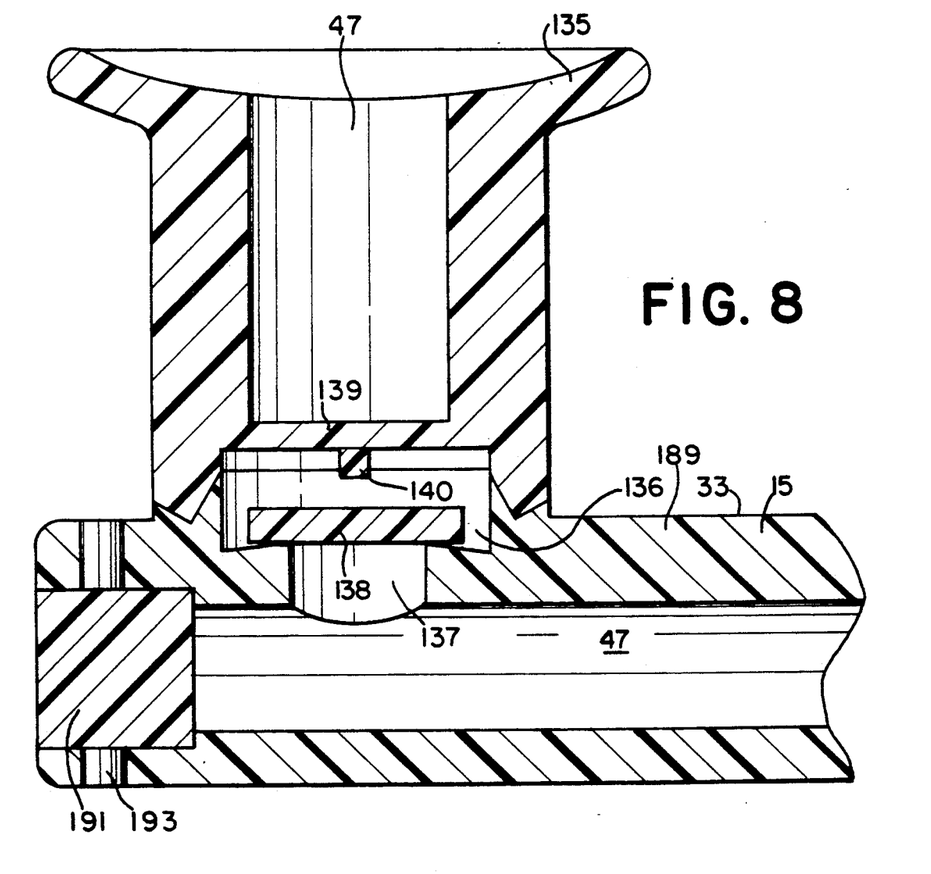
FIG. 8 is a partial view in cross section showing the details of the pump block at its water outlet port.

As shown in FIG. 8, a cylindrical recess 136 is formed in the top wall 33 of pump block 15 around the opening 137 in the top wall 33 leading to passageway 47 inside pump block 15, and a loose rubber flapper member 138 sits over the opening 137. Spaced above flapper member 138 is a flapper valve retainer 139 which is integral with pedestal 48 and which prevents flapper member 138 from flowing into canister 21. As shown in FIGS. 2 and 6, flapper valve retainer 139 is shaped like a cross and has a protuberance 140 extending downwardly from its center.

When water is expelled from pump 19 toward pump block outlet port 45, flapper member 138 is pushed by the water upwardly against flapper valve retainer 139. Protuberance 140 prevents the flapper member 138 from lying flat against the flapper valve retainer 139, thereby preventing flapper member 138 from stopping flow of water from the pump block 15 into the canister 21. When water is being drawn into pump 19, flapper member 138 is pulled against top wall 33 in recess 136 over opening 137, blocking the flow of water from the canister 21 back into the pump block 15. Alternatively, flapper valve retainer 139 may be without protuberance 140 so long as flapper member 138 is sized such that it is large enough to cover opening 137 and small enough to not completely block water flowing from the pump block 15 to the canister 21.

Figure 3:
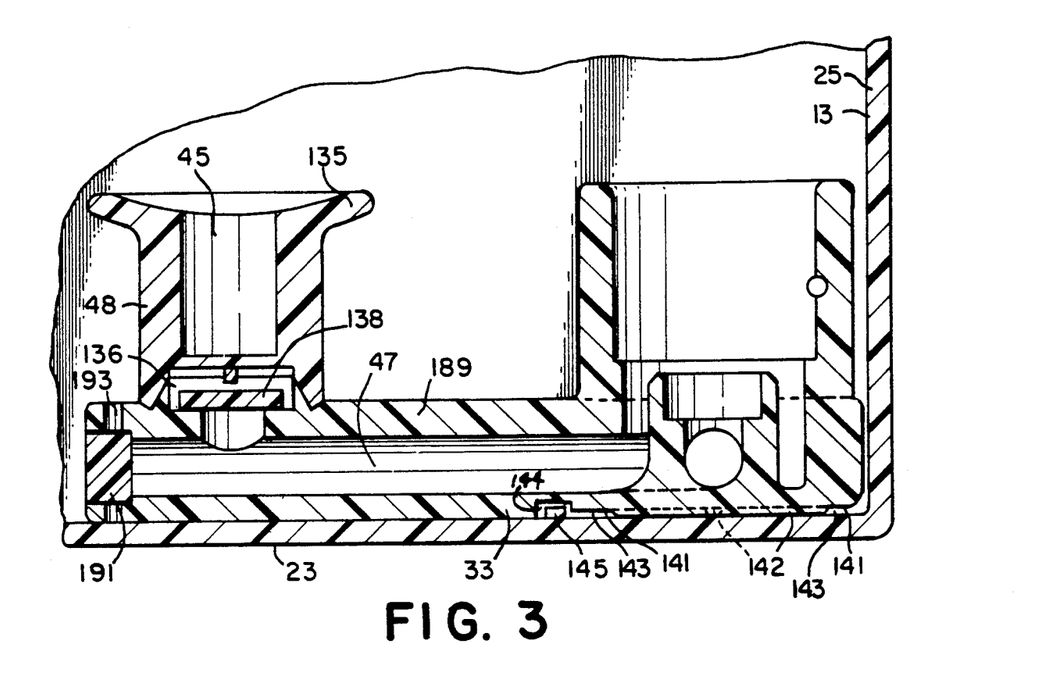
FIG. 3 is a view in section taken along the lines and arrows 3—3 shown in FIG. 2.
Figure 4:
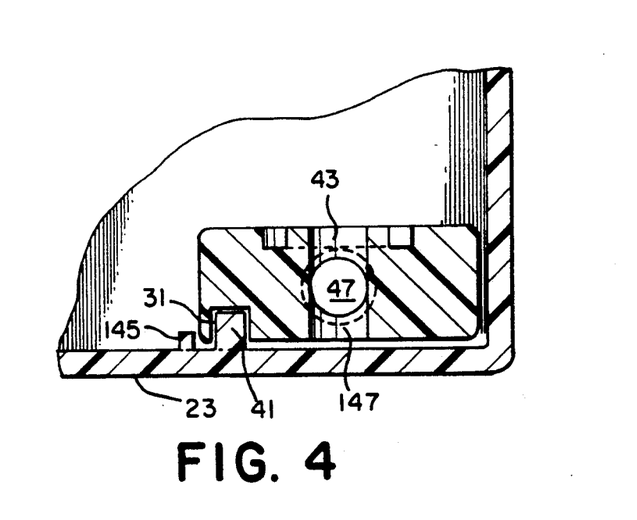
FIG. 4 is a view in section taken along the lines and arrows 4—4 of FIG. 2.

Turning to FIGS. 3 and 5, pump block bottom wall 33 has a portion 141 that is elevated above the bottom wall 23 of container 13 by cross-ribs 142 (FIG. 3) forming a space 143 between container bottom wall 23 and pump block bottom wall 33 to which the unfiltered water in container 13 has access. A groove 144 (FIGS. 2 and 3) is formed in the elevated portion 141 of pump block bottom wall 33 separating the elevated portion 141 from the remaining portion of pump block bottom wall 33.

An L-shaped ridge or fence 145 (FIGS. 2 and 11) is formed in container bottom wall 23 substantially surrounding, in conjunction with a portion of side wall 25, the space 143 between elevated portion 141 of pump block bottom wall 33 and container bottom wall 13. As shown in FIGS. 2 and 3, a portion of fence 145 is received in groove 144 of pump block bottom wall 33, but fence 145 is not in contact with pump block bottom wall 33.

Referring to FIG. 5, a second inlet port 147 is formed in the elevated portion 141 of pump block bottom wall 33 to permit unfiltered water to be pumped through the pump block 15 and canister 21 when the water level in container 13 drops below the bottom end portion of filter unit 17. The small clearance distance shown in FIG. 3 between fence 145 and pump block bottom wall 33 at groove 144 restricts the flow of abrasive sediment, such as sand, on the bottom wall 23 of container 13 to the second inlet port 147 of pump block 15.

The primary flow path into the pump block 15 is through water filter 17 into first water inlet port 43 since the resistance to flow at first inlet port 43 is less than that at the second inlet port 147 due to the less restricted flow path to the pump block inlet port 43.

Figure 12:
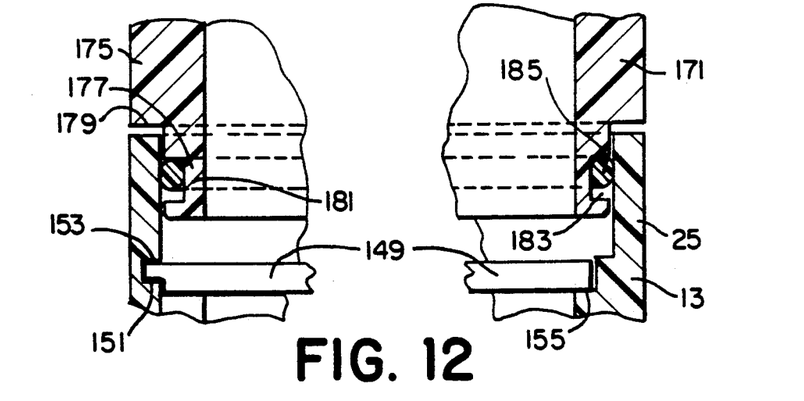
FIG. 12 is a partial view in cross section of the beauty plate mounted on the upper end portion of the container and of a lid inserted onto the container.

As shown in FIGS. 1 and 12, a beauty plate 149 is mounted on the upper end portion of side wall 25. Beauty plate 149 is provided with a flange 151 at its left side portion that is insertable into a corresponding recess 153 formed in side wall 25. Side wall 25 is also provided with a pair of ledges 155 adapted to receive the bottom portion of the rim of the beauty plate at its right side portion. Accordingly, beauty plate 149 may be easily attached to and easily detached from the container 13 as desired.

Beauty plate 149 (FIGS. 9 and 10) has a first opening 157 for receiving and securing the top end portion of pump barrel 63 and a second opening 159 for receiving and securing spout 121 of canister 21. A rubber annular gasket 161 is press fit into opening 159 to restrict lateral movement of spout 121.

Figure 9:
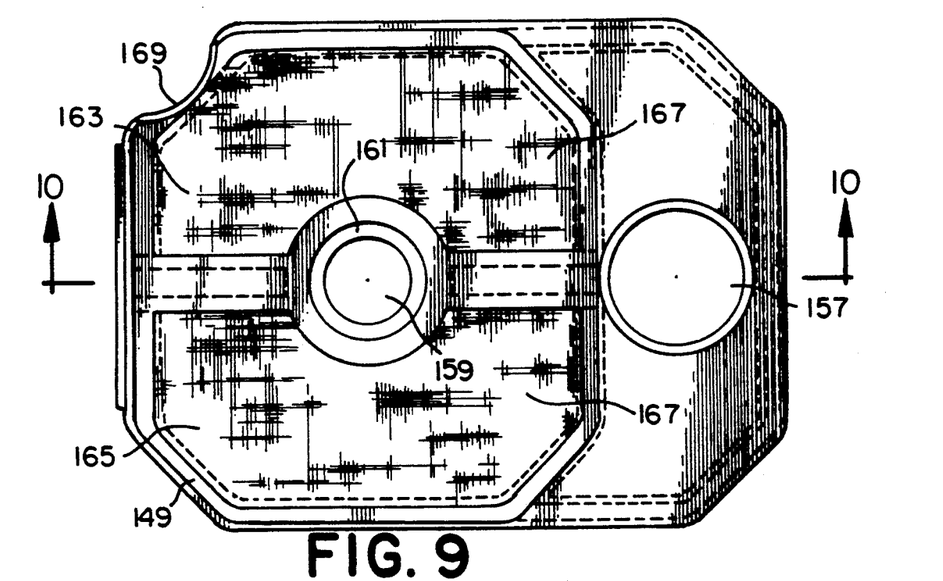
FIG. 9 is a view in top plan of the beauty plate.
Figure 10:
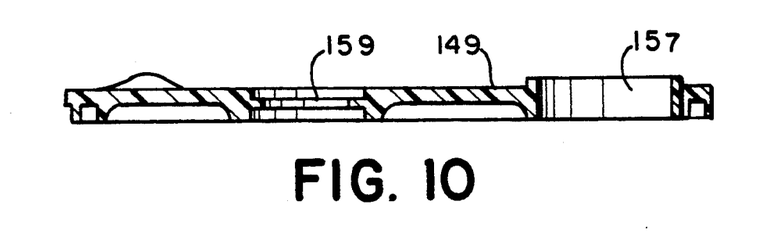
FIG. 10 is a view in cross section taken along the lines and arrows 10—10 of FIG. 9.

Beauty plate 149 also has a third opening 163 and a fourth opening 165 over which a screen 167 is mounted. Screen 167, which preferably is made of nylon, has a mesh in a range of 50 to 350 microns, and preferably in a range of 200 to 250 microns, and is provided to help remove coarse debris as unfiltered water is poured through beauty plate 149 into container 13 for filtering and purifying.

A drainage opening 169 is formed in the rim of beauty plate 149 to permit unneeded unfiltered water to be removed from container 13 by tipping water filtration apparatus 11 to permit said water to drain through drainage opening 169.

Beauty plate 149 adds structural stability to the upper end portion of container 13 by restricting inward motion of side wall 25.

Figure 13:
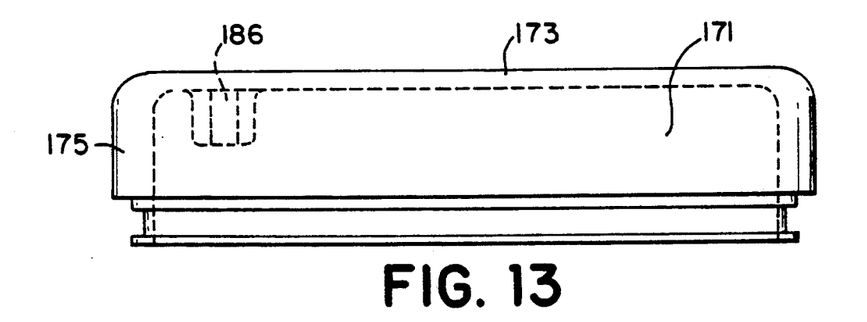
FIG. 13 is a view in front elevation of the lid.
Figure 14:
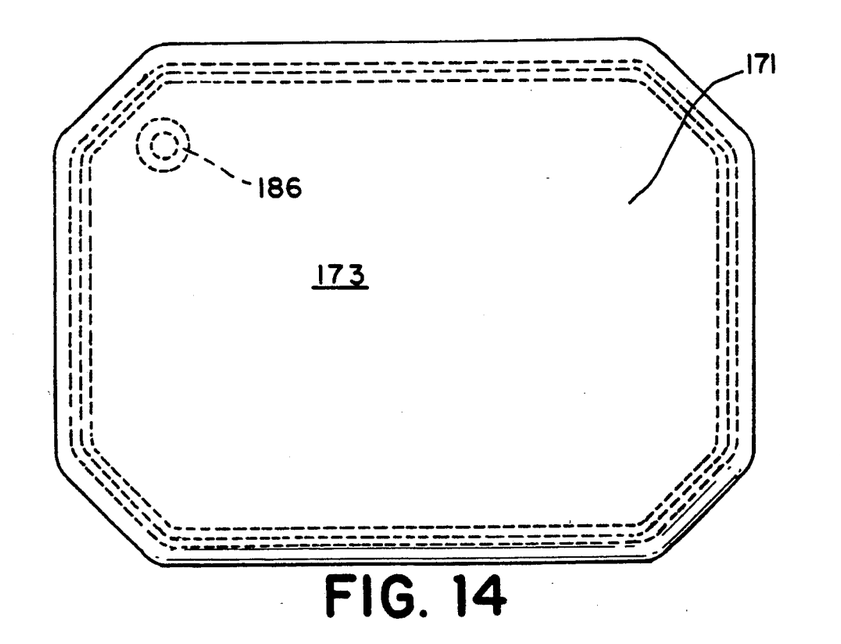
FIG. 14 is a view in top plan of the lid.

A lid 171 (FIGS. 12, 13, and 14) is provided for closing water filtration apparatus 11 when the water filtration apparatus 11 is not being used. Lid 171 has a substantially flat plate-like top wall 173 and downwardly extending side walls 175. A lip 177 is formed along and extends along the bottom edges of side walls 175 and comprises a ledge 179 and a vertical lip wall 181. An annular groove 183 is formed in lip wall 181 and receives a seal 185. When lid 171 closes container 13, the upper end portion of container side wall 25 abuts against ledge 179 and seal 185 abuts against container side wall 25 inside container 13 to seal container 13 against leakage of any water remaining in container 13. Further, since seal 185 is in tight contact with side wall 25, lid 171 remains in place on container 13 until forcibly removed.

Top wall 173 of lid 171 has a downwardly extending stud 186 adapted to hold a cap 188 for spout 121 when apparatus 11 is in use.

Three legs 187 (FIGS. 1 and 11) are formed in the outer bottom wall 23 of container 13 for supporting water filtration apparatus 11. Because there are only three legs 187, water filtration apparatus 11 remains steady, that is, it does not wobble, on practically any surface including uneven surfaces since three points define a plane.

Assembly of water filtration apparatus 11 takes place in two stages. In the first stage of assembly, the pump block 15 is assembled. First, as shown in FIGS. 2 and 3, the two openings to passageway 47 in the side walls of the plastic injected molded body portion 189 of pump block 15 are blocked with plugs 191. Plugs may be attached to pump block 15 by using a pin 193 or by using glue. Then, flapper member 138 is inserted into recess 136, and pedestal 48 is bonded (spin welded) to the body portion 189 of pump block 15.

In the second stage of assembly, flapper member 111 is placed in socket 107, flapper valve retainer 99 is placed on ledge 101, pump barrel 63 with its ring 97 in place is pushed into socket 89, and pin 95 is pushed into bore 97 to engage groove 91 in pump barrel 63 to secure pump barrel 63 to pump block 15.

Then, pump block 15 is mounted on the bottom wall 23 of container 13 by placing annular elastomeric seal 40 in annular recess 38 and then by inserting screw 35 through stud 37 in bottom wall 23 into bore 27 of pump block 15. As pump block 15 is being secured to bottom wall 23, pump block 15 is aligned so that its bores 29 and 31 receive studs 39 and 41.

Water filter unit 17 is secured to pump block 15 by press fitting ring 55 into recess 61.

Then, beauty plate 149 is placed on spout 121 of canister housing 113, and the canister 21 is lowered into container 13 such that inlet stem 125 is received by pedestal 48 and the threaded upper end portion 69 of pump barrel 63 is inserted through opening 157 of beauty plate 149.

Then, beauty plate 149 is attached to the upper end portion of side wall 25 by inserting flange 151 of beauty plate 149 into recess 153 and resting the rim of beauty plate 149 o ledge 155. Thus positioned, the bottom portion of beauty plate 149 surrounding opening 157 sits on ledge 195 formed just below the threaded upper end portion 69 of pump barrel 63.

Then, pump rod 65, onto which the piston 81, the bushing 79, the retaining nut 71, the optional gasket 77, if used, and a handle 189 have been attached, is inserted into pump barrel 63, and retaining nut 71 is screwed onto the threaded upper end portion 69 of pump barrel 63.

To disassemble the water filtration apparatus 11 so that replacement parts may be inserted when original parts wear out, the above-mentioned steps of the second stage of assembly may be repeated in reverse order.

Figure 15:
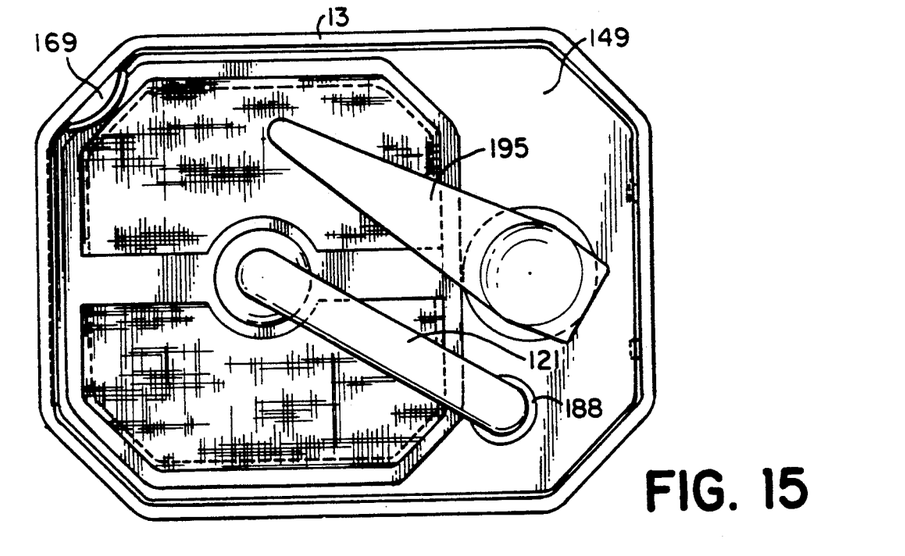
FIG. 15 is a view in top plan showing the spout and the handle in a stored position.
Figure 16:
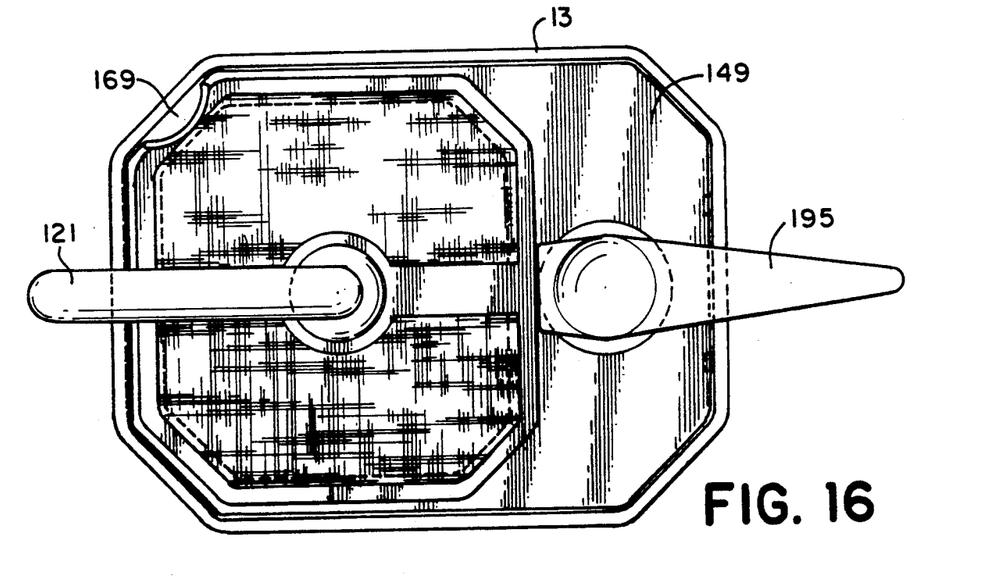
FIG. 16 is a view in top plan showing the position of the spout and the handle in an operating position.
Figure 17:
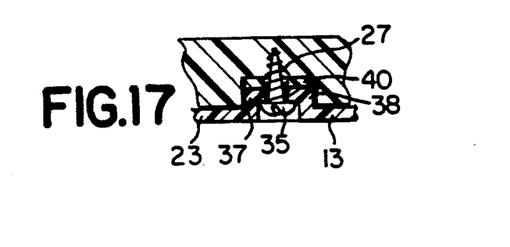
FIG. 17 is a partial view in cross section of the pump block mounted on the container bottom wall.

In use, lid 171 is pulled off container 13, and handle 195 and spout 121 are rotated from a storage position, shown in FIG. 15, to an operating position, shown in FIG. 16. Spout cap 188 is removed from spout 121 and placed on stud 186 for safe keeping.

Container 13 is filled with unfiltered water by pouring the water through screen 167 of beauty plate 149. Screen 167 screens out coarse debris in the water.

The water in container 13 is then pumped through canister 21 into a receptacle by moving pump rod 65 up and down in pump barrel 63 by repeatedly pulling handle 195 upwardly and then downwardly.

When the water level in container 13 is above outlet port 51 of water filtration unit 17, each upstroke of the pump rod 65 pulls water through screen 55 of water filter unit 17, through outlet port 51, through pump block inlet port 43, through the portion of passageway 47 between pump block inlet port 43 and pump 19, through pump barrel port 67, and into pump barrel 63. Each upstroke also pulls water from container 13 through pump block inlet port 147 to pump barrel 63. When the water level in container 13 drops below outlet port 51 of water filter unit 17, float 57 reaches the bottom of tube 49 closing outlet port 51 and blocking air from being sucked into inlet port 43 of pump block 15. With outlet port 51 closed, water may still be pulled into the pump block 15 through inlet port 147 until substantially all of the water has been removed from container 13.

Each downstroke of pump rod 65 pushes the water from pump barrel 63, through the portion of passageway 47 between pump 19 and pump block outlet port 45, through canister 21, and out spout 121 into the receptacle.

With slow steady strokes, water may be pumped at about 1 pint per minute.

Excess water may be discarded from the container 13 by tipping container 13 to permit the water to flow from drainage opening 169. When the water has been emptied from container 13, continued pumping of pump 19 expels loose water from canister 21.

Cap 188 is then placed on spout 121, and spout 121 and pump handle 195 are rotated to a storage position shown in FIG. 15. Lid 171 is then replaced on container 13.

Preferably, container 13, pump block 15, tube 49, flapper valve retainer 99, canister housing 113, canister stem 125, spout 121, beauty plate 149, lid 171, and handle 195 are made of plastic. However, other suitable materials are possible. Preferably, pump barrel 63, retaining nut 71, piston 81, and all pins are made of a corrosion resistant metal, but other suitable materials are possible.

ADVANTAGES

Water may be pumped through water filtration apparatus 11 until container 13 is substantially dry since water may enter pump block 15 from inlet port 147.

Air is not pulled into the pump block 15 through pump block inlet port 43 when the water level in container 13 drops below pump block inlet port 43.

Since spout 121 is integral with housing 113 of canister 21, the possibility of unfiltered water entering a joint between the canister housing 113 and the spout 121 is substantially eliminated.

I claim:

1. A portable water filtration apparatus for filtering and purifying water comprising
   a housing having a bottom wall and a side wall extending upwardly from the bottom wall forming a container for holding water,
   a pump block mounted on the bottom wall of the housing inside the container,
   the pump block having a water inlet port, a water outlet port, and a passageway extending through the pump block between the inlet port and the outlet port,
   a water filter unit mounted on the water inlet port,
   an opening formed in the pump block exposing a portion of the passageway in the pump block,
   a pump having a pump barrel, a pump rod mounted on the pump to move back and forth inside the barrel, the pump barrel having a port at a water receiving/discharging end portion from which to receive and to discharge water,
   the water receiving/discharging end portion of the pump being mounted in the opening in the pump block accessing the port of the pump to the passageway in the pump block,
   first valve means positioned in the passageway of the pump block for blocking flow of water in the passageway from the port of the pump to the inlet port of the pump block,
   a microfiltration canister having a canister housing, a microfiltration matrix positioned inside the canister housing, a canister inlet port, a canister outlet port, and a spout positioned at the outlet port, the canister inlet port of the microfiltration canister being mounted in the water outlet port of the pump block, and second valve means positioned at the outlet port of the pump block for blocking flow of water from the microfiltration canister back into the pump block, said apparatus being of a size to permit it to be carried in a backpack, a suitcase, or a briefcase.

2. The portable water filtration apparatus of claim 1, the water filter unit including a cylindrical tube being closed at its top end and having a outlet port at its bottom end, the tube having openings formed therein and a screen mounted on the tube covering the openings.

3. The portable water filtration apparatus of claim 2, the screen having a mesh in a range of about 1 to about 50 microns.

4. The portable water filtration apparatus of claim 2, the screen having a mesh in a range of 10 to 20 microns.

5. The portable water filtration apparatus of claim 2, further including a float positioned inside the tube and adapted to close the tube outlet port when in contact with it, the float having a specific gravity of less than the specific gravity of water.

6. The portable water filtration apparatus of claim 1, the pump barrel being threaded at its upper end portion, and further including a retaining nut threaded on the upper end portion of the pump barrel, the retaining nut having a first opening for receiving the pump rod, and the retaining nut having a second opening for passage of air into and from the pump barrel as the pump rod is moved up and down in the pump barrel.

7. The portable water filtration apparatus of claim 6, further including a gasket positioned in the pump barrel next to the retaining nut, the gasket being made of a hydrophobic membrane material.

8. The portable water filtration apparatus of claim 1, the first and the second valve means being flapper valves.

9. The portable water filtration apparatus of claim 1, the microfiltration matrix having a 0.1 to 10 micron retention.

10. The portable water filtration apparatus of claim 1, the canister outlet port being integral with the canister housing.

11. The portable water filtration apparatus of claim 1, the pump block having a bottom wall, a portion of the bottom wall of the pump block being elevated above the bottom wall of the housing to create a space between the bottom wall of the pump block and the bottom wall of the housing, a second inlet port formed in the elevated portion of the bottom wall of the pump block and connected to the passageway in the pump block, and fence means mounted on the bottom wall of the housing underneath the elevated portion of the pump block and at least partially surrounding the second inlet port for blocking access of abrasive sediment to the second inlet port.

12. The portable water filtration apparatus of claim 1, further including a beauty plate mounted on the upper end portion of the side wall of the housing, the beauty plate having a first opening for receiving and securing the pump barrel at its upper end portion, a second opening for receiving and securing the spout of the microfiltration canister, a third opening, and a screen mounted on the beauty plate extending across the third opening.

13. The portable water filtration apparatus of claim 12, the screen having a mesh in a range of 50 to 350 microns.

14. The portable water filtration apparatus of claim 12, further including attachment/detachment means for removably mounting the beauty plate to the side wall of the housing.

15. The portable water filtration apparatus of claim 12, further including a drainage opening formed in the beauty plate to drain unfiltered water from the container.

16. The portable water filtration apparatus of claim 1, further including a lid adapted to close the container when the container is not being used.

17. The portable water filtration apparatus of claim 16, the lid having a stud formed in it adapted to receive a cap for the spout of the microfiltration canister.

18. The portable water filtration apparatus of claim 1, further including three legs formed in the bottom wall of the housing on the outside of the container.

19. A portable water filtration apparatus for filtering and purifying water comprising a housing having a bottom wall and a side wall extending upwardly from the bottom wall forming a container for holding water, a pump block mounted on the bottom wall of the housing inside the container, the pump block having a water inlet port, a water outlet port, and a passageway extending through the pump block between the inlet port and the outlet port, a water filter unit mounted on the water inlet port, an opening formed in the pump block exposing a portion of the passageway in the pump block, a pump having a pump barrel, a pump rod mounted on the pump to move back and forth inside the barrel, the pump barrel having a port at a water receiving/discharging end portion from which to receive and to discharge water, the water receiving/discharging end portion of the pump being mounted in the opening in the pump block accessing the port of the pump to the passageway in the pump block, first valve means positioned in the passageway of the pump block for blocking flow of water in the passageway from the port of the pump to the inlet port of the pump block, a microfiltration canister having a canister housing, a microfiltration matrix positioned inside the canister housing, a canister inlet port, a canister outlet port, and a spout positioned at the outlet port, the canister inlet port of the microfiltration canister being mounted in the water outlet port of the pump block, and second valve means positioned at the outlet port of the pump block for blocking flow of water from the microfiltration canister back into the pump block, the water filter unit including a cylindrical tube being closed at its top end and having a outlet port at its bottom end, the tube having openings formed therein and a nylon screen mounted on the tube covering the openings, the nylon screen having a mesh in a range of 10 to 20 microns, a float positioned inside the tube and adapted to close the tube outlet port when in contact with it, the float having a specific gravity of less than the specific gravity of water, the pump barrel being threaded at its upper end portion, and further including a retaining nut threaded on the upper end portion of the pump barrel, the retaining nut having a first opening for receiving the pump rod, and the retaining nut having a second opening for passage of air into and from the pump barrel as the pump rod is moved up and down in the pump barrel, a gasket positioned in the pump barrel next to the retaining nut, the gasket being made of a hydrophobic membrane material, the first and the second valve means being flapper valves, the microfiltration matrix having a 0.1 to 10 micron retention, the canister outlet port being integral with the canister housing, the pump block having a bottom wall, a portion of the bottom wall of the pump block being elevated above the bottom wall of the housing to create a space between the bottom wall of the pump block and the bottom wall of the housing, a second inlet port formed in the elevated portion of the bottom wall of the pump block and connected to the passageway in the pump block, and fence means mounted on the bottom wall of the housing underneath the elevated portion of the pump block and at least partially surrounding the second inlet port for blocking access of abrasive sediment to the second inlet port, a beauty plate mounted on the upper end portion of the side wall of the housing, the beauty plate having a first opening for receiving and securing the pump barrel at its upper end portion, a second opening for receiving and securing the spout of the microfiltration canister, a third opening, and a nylon screen mounted on the beauty plate extending across the third opening, the nylon screen having a mesh in a range of 200 to 250 microns, attachment/detachment means for removably mounting the beauty plate to the side wall of the housing, a drainage opening formed in the beauty plate to drain unfiltered water from the container, a lid adapted to close the container when the container is not being used, the lid having a stud formed in it adapted to receive a cap for the spout of the microfiltration canister, and three legs formed in the bottom wall of the housing on the outside of the container, said apparatus being of a size to permit it to be carried in a backpack, a suitcase, or a briefcase.

* * * * *